United States Patent
Jiang et al.

(10) Patent No.: US 11,019,587 B2
(45) Date of Patent: May 25, 2021

(54) INFORMATION INDICATION METHOD AND APPARATUS, INFORMATION DETECTION METHOD AND APPARATUS AND COMMUNICATION SYSTEM

(71) Applicant: FUJITSU LIMITED, Kawasaki (JP)

(72) Inventors: Qinyan Jiang, Beijing (CN); Hua Zhou, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/445,820

(22) Filed: Jun. 19, 2019

(65) Prior Publication Data
US 2019/0306820 A1 Oct. 3, 2019

Related U.S. Application Data

(63) Continuation of application No. PCT/CN2017/083313, filed on May 5, 2017.

(51) Int. Cl.
*H04W 56/00* (2009.01)
(52) U.S. Cl.
CPC ....... *H04W 56/0015* (2013.01); *H04W 56/00* (2013.01)
(58) Field of Classification Search
CPC ...... H04W 84/18; H04W 88/08; H04W 84/12
See application file for complete search history.

(56) References Cited

U.S. PATENT DOCUMENTS

| 2018/0167946 A1* | 6/2018 | Si ......................... H04L 1/0061 |
| 2018/0192383 A1* | 7/2018 | Nam ................. H04W 56/001 |
| 2018/0227867 A1* | 8/2018 | Park ..................... H04L 5/005 |
| 2018/0248642 A1* | 8/2018 | Si ......................... H04L 5/0053 |

(Continued)

FOREIGN PATENT DOCUMENTS

| CN | 104349464 A | 2/2015 |
| CN | 105591712 A | 5/2016 |

(Continued)

OTHER PUBLICATIONS

International Search Report issued by the State Intellectual Property Office of the P.R. China for corresponding International Patent Application No. PCT/CN2017/083313, dated Jan. 19, 2018, with an English translation.

(Continued)

*Primary Examiner* — Hassan A Phillips
*Assistant Examiner* — Prenell P Jones
(74) *Attorney, Agent, or Firm* — Myers Wolin, LLC

(57) ABSTRACT

An information indication method and apparatus, information detection method and apparatus and communication system. The information indication apparatus includes: a first transmitting unit configured to transmit first indication information to UE indicating a position of a synchronization signal (SS)/physical broadcast channel (PBCH) block (SS/PBCH block) in a signal transmission period (an SS burst set); wherein, the first indication information includes at least two parts of information. Hence, the position of the synchronization signal in the signal transmission period by at least two parts information, so that frame timing at the UE side is supported, and currently existed problems are solved.

15 Claims, 7 Drawing Sheets

(56) References Cited

U.S. PATENT DOCUMENTS

| | | | |
|---|---|---|---|
| 2018/0262308 A1* | 9/2018 | Si | H04L 5/0051 |
| 2018/0270699 A1* | 9/2018 | Babaei | H04W 28/0278 |
| 2018/0279193 A1* | 9/2018 | Park | H04W 36/08 |
| 2018/0287728 A1* | 10/2018 | Ly | H04J 11/0079 |
| 2018/0324022 A1* | 11/2018 | Sheng | H04L 5/0094 |
| 2019/0058620 A1* | 2/2019 | Liu | H04L 27/2613 |
| 2019/0200306 A1* | 6/2019 | Ko | H04B 7/06 |
| 2019/0261297 A1 | 8/2019 | Li et al. | |
| 2019/0274172 A1* | 9/2019 | Yoon | H04W 74/0866 |
| 2019/0393972 A1* | 12/2019 | Pan | H04J 11/0069 |
| 2020/0136739 A1* | 4/2020 | Si | H04J 11/0076 |
| 2020/0137792 A1* | 4/2020 | Yoon | H04L 5/0041 |

FOREIGN PATENT DOCUMENTS

| | | |
|---|---|---|
| CN | 106455040 A | 2/2017 |
| WO | 2014/178946 A1 | 11/2014 |

OTHER PUBLICATIONS

Written Opinion of the International Searching Authority issued by the State Intellectual Property Office of the P.R. China for corresponding International Patent Application No. PCT/CN2017/083313, dated Jan. 19, 2018, with an English translation.

Extended European search report with supplementary European search report and the European search opinion issued by the European Patent Office for corresponding European Patent Application No. 17908136.9-1205, dated Nov. 11, 2020.

Samsung, "SS block composition, SS burst set composition and SS time index indication", Agenda item: 8.1.1.1.2, 3GPP TSG-RAN WG1 Meeting #88bis, R1-1705318, Spokane, USA, Apr. 3-7, 2017.

MCC Support, "Draft Report of 3GPP TSG RAN WG1 #88bis v0.1.0 (Spokane, USA, Apr. 3-7, 2017)", 3GPP TSG RAN WG1 Meeting #89, R1-17xxxxx, Hangzhou, China, May 15-19, 2017.

Notification of Reasons for Refusal issued by the Japan Patent Office for corresponding Japanese Patent Application No. 2019-560223, dated Nov. 17, 2020, with a full English machine translation.

Zte et al., "Composition of SS block, burst and burst set", Agenda Item: 8.1.1.1.2, 3GPP TSG RAN WG1 Meeting #88bis, R1-1704358, Spokane, USA, Apr. 3-7, 2017.

NTT Docomo, Inc., "Discussion on SS block composition, SS burst set composition and SS block index indication for NR", Agenda Item: 8.1.1.1.2, 3GPP TSG RAN WG1 Meeting #88bis, R1-1705705, Spokane, USA, Apr. 3-7, 2017.

Intel Corporation, "Synchronization Signal Sequence Design", Agenda Item: 8.1.1.1.5, 3GPP TSG RAN WG1 Meeting RAN1 #88, R1-1702180, Athens, Greece, Feb. 13-17, 2017.

Nokia et al., "On Requirements and Design of SS Burst Set and SS Block Index Indication", Agenda Item: 8.1.1.1.2, 3GPP TSG RAN WG1 Meeting #88, R1-1703092, Athens, Greece, Feb. 13-17, 2017.

Samsung et al., "WF on SS Burst Set Timing Indication", Agenda Item: 8.1.1.1.2, 3GPP TSG-RAN WG1 Meeting #88b, R1-1706398, Spokane, USA, Apr. 3-7, 2017.

Examination Report issued by the Patent Office of India for corresponding Indian Patent Application No. 201937035276, dated Feb. 17, 2021, with a full English translation.

Notice of Preliminary Rejection issued by the Korean Intellectual Property Office for corresponding Korean Patent Application No. 10-2019-7026009, dated Feb. 26, 2021, with an English translation.

Notice of Reasons for Refusal issued by the Japan Patent Office for corresponding Japanese Patent Application No. 2019-560223, dated Mar. 2, 2021, with an English translation.

Fujitsu, "Consideration on SS block time index indication", Agenda item: 7.1.1.13, 3GPP TSG-RAN WG1 Meeting 189, R1-1707252, Hangzhou, P.R. China, May 15-19, 2017.

First Notification of Office Action and Search Report issued by the China National Intellectual Property Administration for corresponding Chinese Patent Application No. 201780088656.5, dated Mar. 1, 2021, with an English translation.

* cited by examiner

INFORMATION INDICATION METHOD AND APPARATUS, INFORMATION DETECTION METHOD AND APPARATUS AND COMMUNICATION SYSTEM

CROSS REFERENCE TO RELATED APPLICATIONS

This application is a continuation application of International Application PCT/CN2017/083313 filed on May 5, 2017, the entire contents of which are incorporated herein by reference.

FIELD

This disclosure relates to the field of communication technologies, and in particular to an information indication method and apparatus, an information detection method and apparatus and a communication system.

BACKGROUND

In a long term evolution (LTE) system, a user equipment (UE) achieves downlink synchronization (including frequency and symbol synchronization) by detecting synchronization signals, acquires timing boundary of a single system frame, and determines physical cell identifiers (PCIs). For example, a network side periodically transmits two groups of synchronization signals at different time positions, in each transmission period, each group of synchronization signals in the two groups of synchronization signals containing a primary synchronization signal (PSS) and a secondary synchronization signal (SSS); wherein, PSS sequences in the two groups of synchronization signals are identical, while SSS sequences therein are different. Hence, the UE may acknowledge positions of the synchronization signals in the transmission period according to the detected SSS sequences, thereby learning the timing boundary of the single system frame.

Furthermore, the UE not only needs to detect synchronization signals in initially accessing to a cell to achieve downlink synchronization, but also, in order to support mobility, searches for neighboring cells ceaselessly after initially accessing to the cell to achieve synchronization and estimate received quality of the cell signals, thereby determining whether to perform cell handover or cell reselection.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a future wireless communication system, such as a 5G or a new radio (NR) system, wireless spectrum resources of higher frequencies and larger bandwidths, such as centimeter waves and millimeter waves, are adopted to be addressed to ever-increasing wireless traffics and a variety of new services; however, high frequency bands will be subjected to severe transmission loss. In order to solve this problem, a massive antenna technology (massive MIMO) may be used to resist severe transmission attenuation by larger beamforming gains. Since a single beam of a base station can only cover UE within a certain direction range in the cell, the base station needs to transmit synchronization signals and physical broadcast channels (PBCHs) in a time-division manner by using a plurality of beams to ensure that all UE in the cell may receive the synchronization signals and the PBCHs. As a search time of the UE side should be as short as possible, the number of synchronization signals transmitted by the base station in a single signal transmission period is correspondingly increased.

For example, the base station transmits synchronization signal(SS)/physical broadcast channel (PBCH) blocks (SS/PBCH blocks) by taking a signal transmission period (such as an SS burst set transmission period) as a period, an SS/PBCH block including a PSS, an SSS, and/or a PBCH, and the number of SS/PBCH blocks transmitted in each transmission period being one or more (for example, 64). When a plurality of SS/PBCH blocks are transmitted, different SS/PBCH blocks may be transmitted with different numbers and/or directions of beams. There is currently no effective solution for indicating positions of SS/PBCH blocks in a signal transmission period. In such a case, if an existing indication mode is directly extended, that is, an SSS sequence is used to indicate a position of an SS/PBCH block within an SS burst set, there may exist various problems. For example, on the one hand, the number of SSS sequences may be insufficient to indicate positions of all synchronization signals in the signal transmission period;

and on the other hand, the indication by the number of extended SSS sequences also increases complexity and search time of blind detection by the UE side.

In order to solve the above problems, embodiments of this disclosure provide an information indication method and apparatus, information detection method and apparatus and communication system, in which positions of synchronization signals in a transmission period may be indicated, so as to support frame timing at a UE side.

According to a first aspect of the embodiments of this disclosure, there is provided an information indication method, including:

transmitting first indication information to UE indicating a position of a synchronization signal (SS)/physical broadcast channel (PBCH) block (SS/PBCH block) in a signal transmission period; wherein, the first indication information includes at least two parts of information.

According to a second aspect of the embodiments of this disclosure, there is provided an information detection method, including:

receiving first indication information of a network side indicating a position of a synchronization signal (SS)/physical broadcast channel (PBCH) block (SS/PBCH block) in a signal transmission period, the first indication information including at least two parts of information.

According to a third aspect of the embodiments of this disclosure, there is provided an information configuration method, including:

placing at least a part of DMRS in a symbol where a synchronization signal is located.

According to a fourth aspect of the embodiments of this disclosure, there is provided an information indication apparatus, including:

a transmitting unit configured to transmit first indication information to UE indicating a position of a synchronization signal (SS)/physical broadcast channel (PBCH) block (SS/PBCH block) in a signal transmission period; wherein, the first indication information includes at least two parts of information.

According to a fifth aspect of the embodiments of this disclosure, there is provided an information detection apparatus, including:

a receiving unit configured to receive first indication information of a network side indicating a position of a synchronization signal (SS)/physical broadcast channel (PBCH) block (SS/PBCH block) in a signal transmission period, the first indication information including at least two parts of information.

According to a sixth aspect of the embodiments of this disclosure, there is provided an information configuration apparatus, including:

a processing unit configured to place at least a part of DMRS in a symbol where a synchronization signal is located.

An advantage of the embodiments of this disclosure exists in that according to the embodiments of this disclosure, a position of a synchronization signal in a transmission period may be indicated by at least two parts information, so as to support frame timing at a UE side, thereby solving problems existing in the related art.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a flowchart of the information indication method in Embodiment 1;

FIG. 2 is a schematic diagram of transmitting synchronization signals by a base station in a future wireless communication system;

FIG. 3 is a schematic diagram of a structure of an SS/PBCH block;

FIG. 4 is a schematic diagram characterizing a manner of positions of SS/PBCH blocks in a signal transmission period;

FIG. 5 is a schematic diagram characterizing a manner of positions of SS/PBCH blocks in a signal transmission period;

FIG. 6 is a schematic diagram of a structure of the SS/PBCH block in Embodiment 1;

FIG. 7 is a flowchart of the information detection method in Embodiment 2;

FIG. 8 is a flowchart of the information configuration method in Embodiment 3;

FIG. 9 is a schematic diagram of a structure of the information indication apparatus in Embodiment 4;

FIG. 10 is a schematic diagram of a structure of the network device in Embodiment 5;

FIG. 11 is a schematic diagram of a structure of the information detection apparatus in Embodiment 6;

Figure 12:
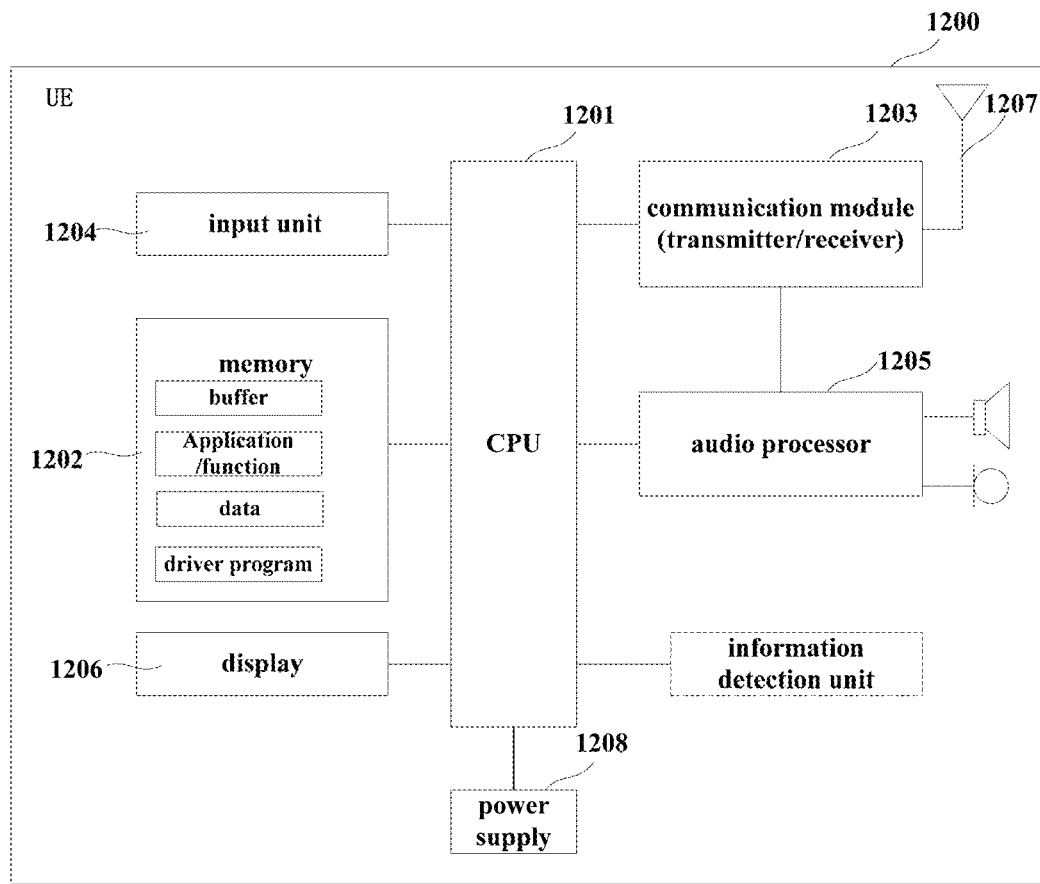
Figure 13:
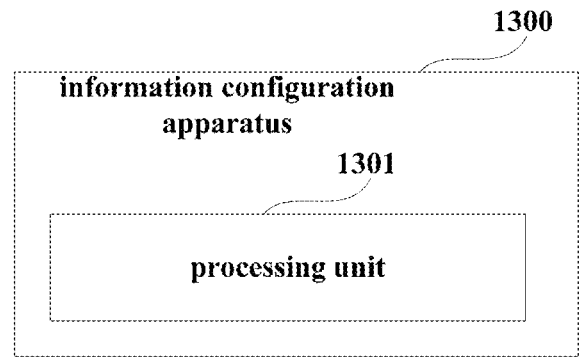
Figure 14:
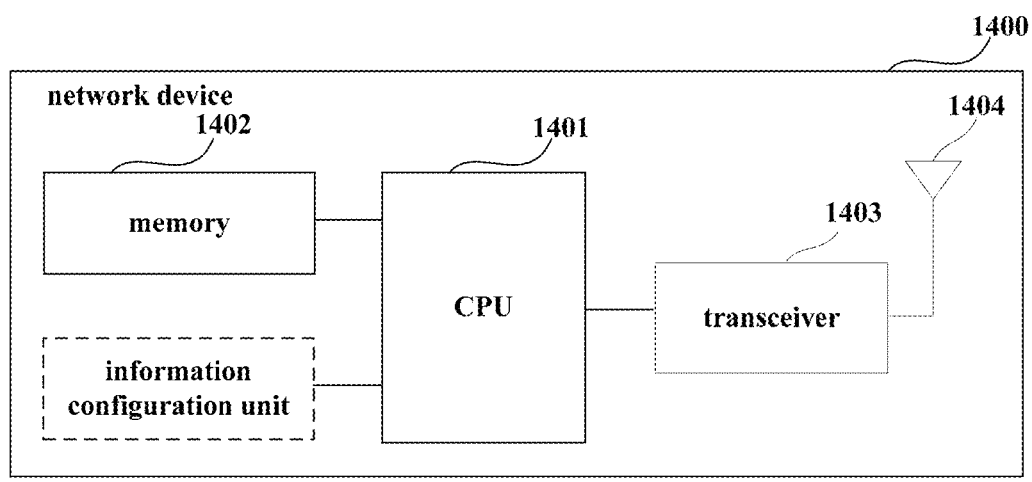
Figure 15:
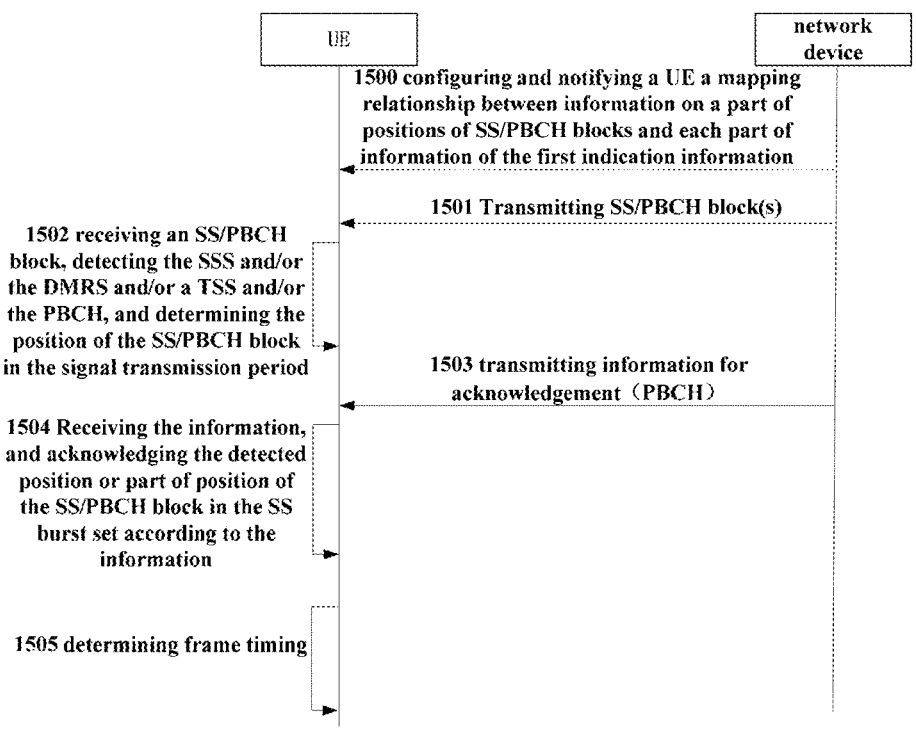

FIG. 12 is a schematic diagram of a structure of the UE in Embodiment 7;

FIG. 13 is a schematic diagram of a structure of the information configuration apparatus in Embodiment 8;

FIG. 14 is a schematic diagram of a structure of the network device in Embodiment 9; and FIG. 15 is a flowchart of a method for acquiring frame timing in Embodiment 9.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

For example, the base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

For example, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

The embodiments of this disclosure shall be described below with reference to the accompanying drawings.

Embodiment 1

Figure 1:
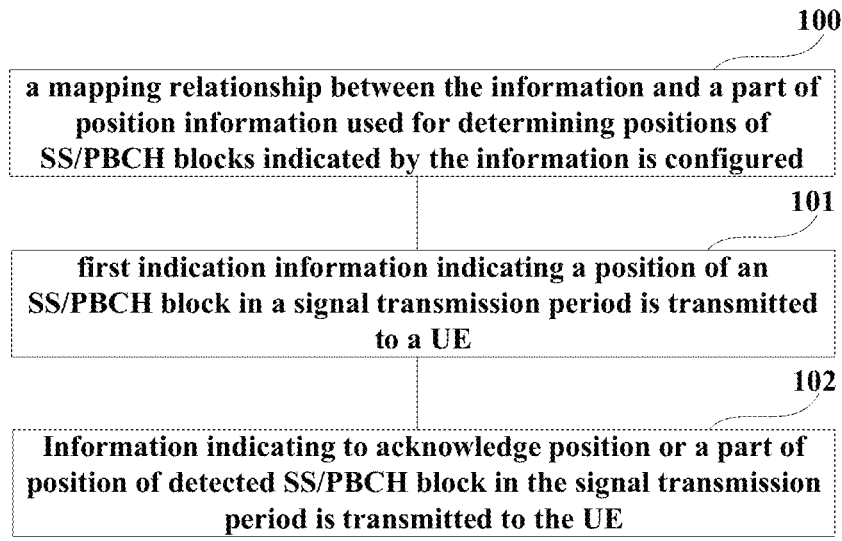

FIG. 1 is a flowchart of the information indication method in Embodiment 1, which is applicable to a network side. As shown in FIG. 1, the method includes:

block 101: first indication information indicating a position of a synchronization signal (SS)/physical broadcast channel (PBCH) block (SS/PBCH block) in a signal transmission period is transmitted to a UE; wherein, the first indication information includes at least two parts of information.

It can be seen from the above embodiment that the position of the synchronization signal in the transmission period may be indicated by at least two parts information, so as to support frame timing at a UE side, thereby solving problems existing in the related art.

In an embodiment, each of the at least two parts of information is used to indicate partial position information of the position of the SS/PBCH block. In this way, after the UE receives each part of information, the partial position information of the SS/PBCH block may be determined by using each part of information, and then the position of the SS/PBCH block in the signal transmission period are determined according to the partial position information, so as to obtain timing boundary of a single system frame. For example, the position of the SS/PBCH block may be characterized by an index, in which case the partial position information of the position of the SS/PBCH block refers to partial information of the SS/PBCH block index. And when the index expressed by using information bits, the partial information refers to a part of bits.

In an embodiment, each part of information of the first indication information may be indicated by the following information:

a signal sequence, information on a demodulation reference signal (DMRS) sequence or information on a physical broadcast channel (PBCH). However, the embodiment is not limited to the above information, and other information may also be used for indication, which shall not be enumerated herein any further.

It can be seen from the above embodiment that the position of the synchronization signal in the transmission period may be indicated by at least two parts information, so as to support frame timing at a UE side, thereby solving problems existing currently.

A method for indicating the position of the SS/PBCH block shall be described below by taking synchronization signals (such as an SS/PBCH blocks) transmitted by a network side in a future wireless communication system as an example. However, it should be noted that the method is not limited to the communication system, and it is applicable to other communication systems concerning indication of a synchronization signal.

Figure 2:
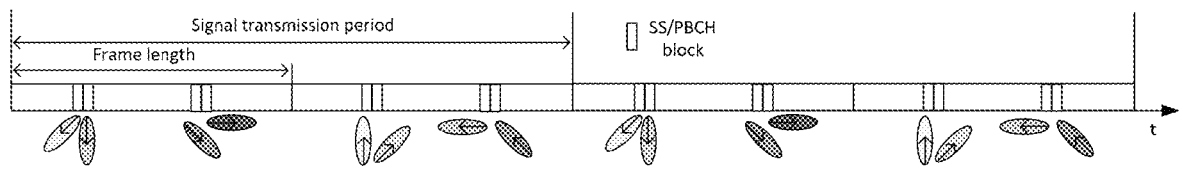

FIG. 2 is a schematic diagram of transmitting synchronization signals by a base station in a future wireless communication system. As shown in FIG. 2, a network side device, such as a base station, transmits at least one SS/PBCH block by taking a signal transmission period (such as an SS burst set) as a basic period. As shown in FIG. 2, K SS/PBCH blocks may be transmitted in each signal transmission period, and different SS/PBCH blocks may be transmitted by using identical or different numbers and/or directions of beams (including omni-directional beams); where, K is greater than or equal to 1, which is 8 in FIG. 2. A single system frame length and signal transmission period are 10 ms and 20 ms, respectively; however, the number of K, the single system frame length, the signal transmission period, and the number and direction of the transmission beams of each SS/PBCH block, or the like, are not limited to the above embodiment, which shall not be enumerated herein any further.

Figure 3:
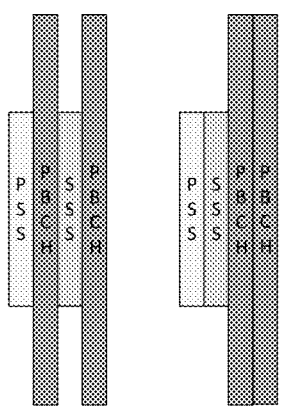

In an embodiment, the SS/PBCH blocks periodically transmitted by the network side may be used to support cell synchronization, measurement, and information broadcast, etc.; for example, an SS/PBCH block may include synchronization signal(s), and/or a broadcast channel, and/or a reference signal, etc., as shown in FIG. 3. For example, the synchronization signal(s) may be primary synchronization signals (PSS/NR-PSSs), and/or secondary synchronization signals (SSS/NR-SSSs), etc., and the broadcast channel may be a physical broadcast channel (PBCH/NR-PBCH).

FIG. 3 is a schematic diagram of a structure of the synchronization signal (SS)/physical broadcast channel (PBCH) blocks in an embodiment. As shown in FIG. 3, the SS/PBCH block may include a PSS and an SSS, and may further include a PBCH. A structure of the synchronization signal (SS)/physical broadcast channel (PBCH) blocks is not limited to that shown in FIG. 3, and other structures may also be employed, such containing a reference signal, etc.

In an embodiment, the position of the SS/PBCH block may be characterized by an index, and each part of the at least two parts of information is respectively used to indicate partial information (such as a part of bits) of the index of the SS/PBCH block.

In one implementation, the position of the SS/PBCH block may be characterized by the index of the SS/PBCH block throughout the signal transmission period (e. g, an SS burst set). For example, when the index denoted by information bits, the information bits of the index are Y bits, and each part of information of the at least two parts of information is used to indicate a part of the Y bits.

For example, the information bits of the SS/PBCH block index to be indicated are Y bits, and when the SS/PBCH block index is indicated by using partial information of a number of X, the Y bits may be divided into X parts, the numbers of bits in each part being $Y_1, Y_2, \ldots, Y_X$, respectively; where, $Y_1+Y_2+ \ldots +Y_X=Y$, each part of information in the X parts of information respectively indicating $Y_1, Y_2, \ldots, Y_X$ bits; where, X is greater than or equal to 2, and is an integer. In an implementation, $Y_1, Y_2, \ldots, Y_X$ may be identical or different.

In one implementation, the position of the SS/PBCH block is characterized by a group index of an SS/PBCH block group where the SS/PBCH block is located in the signal transmission period (such as an SS burst set) and an index of the SS/PBCH block in the SS/PBCH block group, and the at least two parts of information may be used to respectively indicate all or a part of bits of the group index and all or a part of bits of the index of the SS/PBCH block in the SS/PBCH block group.

For example, when the SS/PBCH block index is indicated by the partial information of the number X and information bits of the group index is $Y_1$ and information bits of the SS/PBCH block index in the group is $Y_2$, $Y_1$ may be divided into $X_1$ parts, the number of bits of each part being $Y_{11}, Y_{12}, \ldots, Y_{1X}$, respectively; where, $Y_{11}+Y_{12}+ \ldots +Y_{1X}=Y_1$, and each part of information in the $X_1$ parts of information indicating $Y_{11}, Y_{12}, Y_{1X}$ bits, respectively; and $Y_2$ may be divided into $X_2$ parts, the number of bits of each part being $Y_{21}, Y_{22}, \ldots, Y_{2X}$; where, $Y_{21}+Y_{22}+ \ldots +Y_{2X}=Y_2$, and each part of the information in the $X_2$ parts of information indicating $Y_{21}, Y_{22}, \ldots, Y_{2X}$ bits, respectively; where, $X_1+X_2=X$, X is greater than or equal to 2, $X_1$ and $X_2$ are greater than or equal to 1, and are all integers. In an implementation, $Y_{11}, Y_{12}, \ldots, Y_{1X}$ may be identical or different, and $Y_{21}, Y_{22}, \ldots, Y_{2X}$ may be identical or different.

How to indicate the partial information of the position of the SS/PBCH block by the at least two parts (X) of information shall respectively be described below.

Figure 4:
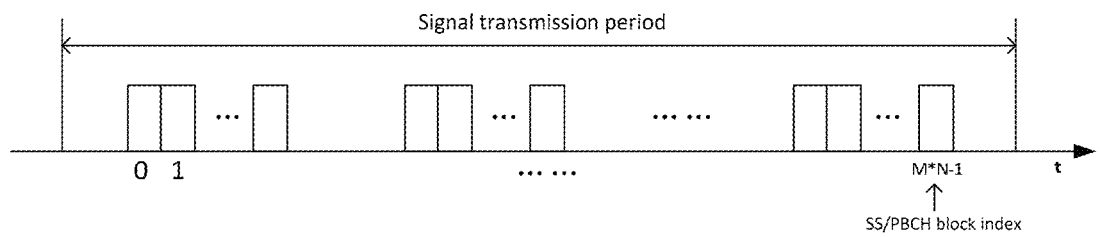
Figure 5:
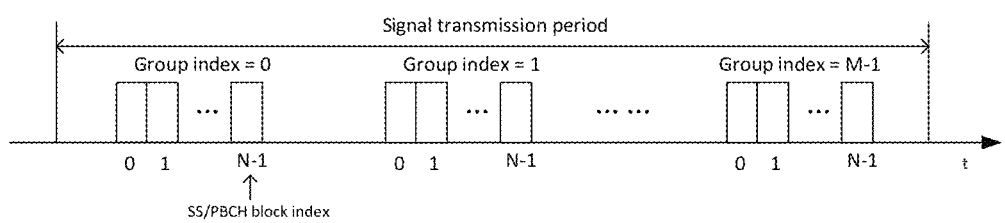

FIG. 4 and FIG. 5 are respective schematic diagrams of two characterizing manners of positions of SS/PBCH blocks in a signal transmission period. As shown in FIG. 4, the position of the SS/PBCH block in the signal transmission period, such as the SS burst set, may be characterized by the index (0, 1, . . . , M×N−1) of the SS/PBCH block in the whole signal transmission period; wherein, M×N denotes the number of the SS/PBCH blocks. As shown in FIG. 5, the SS/PBCH blocks transmitted in the signal transmission period, such as SS burst set, are divided into a plurality of groups, such as M SS/PBCH block groups, group indexes of groups being 0, 1, . . . , M−1, each group being a subset of the SS/PBCH block set in the SS burst set, each group including a plurality of SS/PBCH blocks that are continuously transmitted or discontinuously transmitted, the indexes of the SS/PBCH blocks in each group being 0, 1, . . . , N−1, and the number of SS/PBCH blocks in each group identical. The position of the SS/PBCH block is characterized by the group index of the SS/PBCH block group where the SS/PBCH block is located in the signal transmission period and SS/PBCH block index of the SS/PBCH block in the SS/PBCH block group. It should be noted that the SS/PBCH blocks in each group shown in these figures are identical; however, this disclosure is not limited thereto.

For example, when X=2, the partial information of the position of the SS/PBCH block is indicated by the two parts of information, respectively.

When the characterizing manner shown in FIG. 4 is adopted, a part of information is used to indicate the most significant bits (MSB) of the SS/PBCH block index, and another part of information is used to indicate least significant bits (LSB) of the SS/PBCH block index; or when the characterizing manner shown in FIG. 5 is adopted, a part of information is used to indicate the group index of the SS/PBCH block group, and another part of information is used to indicate the index of the SS/PBCH block in the SS/PBCH block group.

For example, as shown in FIG. 4, there are M×N SS/PBCH blocks in the SS burst set, the index of an SS/PBCH block is denoted by information bits, the number of the information bits is $Y=\lceil \log_2(M \times N) \rceil$, a part of information of the first indication information is used to indicate information of higher P (0<P<Y) bits in the Y bits, and another part of the information is used to indicate information of lower (Y-P) bits in the Y bits. In this way, the UE, according to the two parts of information, respectively determines the partial information of the SS/PBCH block indicated by them, so as to determine the position of the SS/PBCH block in the SS burst set, and obtain frame timing.

For example, as shown in FIG. 5, there are M×N SS/PBCH blocks in the SS burst set, and the M×N SS/PBCH blocks are divided into M groups, group indexes being 0~M−1, respectively, each group containing N SS/PBCH blocks, and indexes of the SS/PBCH blocks being 0~N−1, respectively. The group index and the index of the SS/PBCH block in the group are all denoted by information bits, a part of information of the first indication information is used to indicate group index 0~M−1 of the group, a total number of its bits being $Y_1=\lceil \log_2 M \rceil$, and another part of the first indication information is used to indicate the index 0~N−1 of the SS/PBCH block in the group, a total number of its bits being $Y_2=\lceil \log_2 N \rceil$ The UE, according to the two parts of information, respectively determines the partial information of the SS/PBCH block indicated by them, so as to determine the position of the SS/PBCH block in the SS burst set, and obtain frame timing.

For example, when X=4, the partial information of the position of the SS/PBCH block is indicated by four parts of information, respectively.

When the characterizing manner shown in FIG. 4 is adopted, the four parts of information are respectively used to indicate four parts of the SS/PBCH block index, such as highest bits, next highest bits, secondary lowest bits, and lowest bits (the numbers of bits of the highest bits, the next highest bits, the second lowest bits, and the lowest bits may be identical or different), or, when the characterization manner shown in FIG. 5 is adopted, two parts of information are used to indicate higher bits and lower bits of the group index of the SS/PBCH block group (the numbers of bits of the higher bits and low bits may be identical or different), and the other two parts of information are used to indicate higher bits and lower bits of the index of the SS/PBCH block in the SS/PBCH block group (the numbers of bits of the higher bits and lower bits may be identical or different); or, a part of the information thereof is used to indicate all bits of the group index of the SS/PBCH block group, and the other three parts of information are used to indicate higher bits, middle bits and lower bits of the index of the SS/PBCH block in the SS/PBCH block group (the numbers of bits of the higher bits, the middle bits and lower bits may be identical or different), or three parts of information thereof are used to indicate higher bits, middle bits and lower bits of the group index of the block group (the numbers of bits of the higher bits, the middle bits and lower bits may be identical or different), and the other part of the information thereof is used to indicate all bits of the index of the SS/PBCH block in the SS/PBCH block group, and the embodiment is not limited thereto.

For example, as shown in FIG. 4, there are M×N SS/PBCH blocks in an SS burst set, the index of the SS/PBCH block is denoted by information bits, the number of the information bits is $Y=\lceil \log_2 (M \times N) \rceil$, the four parts of information of the first indication information are used to indicate information of high P1 (0<P<Y) bits, information of next high P2 bits, secondary low P3 bits, and low P4 bits in the Y bits, P1+P2+P3+P4=Y. In this way, the UE, according to the four parts of information, respectively determines the partial information of the SS/PBCH blocks indicated by them, so as to determine the position of the SS/PBCH block in the SS burst set, and obtain frame timing.

For example, as shown in FIG. 5, there are M×N SS/PBCH blocks in an SS burst set, and the M×N SS/PBCH blocks are divided into M groups, group indexes being 0~M−1, respectively, each group containing N SS/PBCH blocks, and indexes of the SS/PBCH blocks being 0~N−1, respectively. Group index and the index of the SS/PBCH block in the groups are all denoted by information bits, two parts of information of the first indication information are used to indicate higher bits P1 and lower bits P2 of group index 0~M−1 of the group, and a total number of their bits being $Y_1=\lceil \log_2 M \rceil$; wherein, the other two parts of information of the first indication information indicate higher bits P3 and lower bits P4 of the index 0~N−1 of the SS/PBCH block in the group, a total number of their bits being $Y_2=\lceil \log_2 N \rceil$; or, one part of information of the first indication information is used to indicate group index 0~M−1 of the group, a total number of their bits being $Y_1=\lceil \log_2 M \rceil$; wherein, the other three parts of information of the first indication information indicate higher bits P1, middle bits P2 and lower bits P3 of the index of the SS/PBCH block in the SS/PBCH block group, a total number of their bits being $Y_2=\lceil \log_2 N \rceil$; or, three parts of information of the first indication information indicates higher bits P1, middle bits P2 and lower bits P3 of the group index 0~M−1 of the group, a total number of their bits being $Y_1=\lceil \log_2 M \rceil$; wherein, the other one part of information of the first indication information indicate the index 0~N−1 of the SS/PBCH block in the group, a total number of their bits being $Y_2=\lceil \log_2 N \rceil$. The UE, according to the four parts of information, respectively determines the partial information of the SS/PBCH block index indicated by them, so as to determine the position of the SS/PBCH block in the SS burst set, and obtain frame timing.

The at least two parts of information are described above by taking X=2 or X=4 as examples. Indication manners are similar when X is other values, which shall not be enumerated herein any further.

In an embodiment, as described above, each part of information in the first indication information may be indicated via the following information:

a signal sequence, information on a demodulation reference signal (DMRS) sequence, or information on a physical broadcast channel (PBCH); for example, the signal sequence may include an SSS sequence or a demodulation reference signal (DMRS) sequence or a tertiary synchronization signal (TSS) sequence, the information on a DMRS sequence includes a frequency domain offset or a time domain offset of a time-frequency resource occupied by the DMRS sequence, or an orthogonal cover code of the DMRS sequence; and the information on a PBCH includes a PBCH payload, or a scrambling sequence of a PBCH, or a cyclic shift adopted by bit information contained in a PBCH, or a cyclic redundancy check (CRC) mask of CRC carried by a scrambled PBCH. However, each part of information is not limited to the above information, and other information may be included, which shall not be enumerated herein any further.

For example, when the first indication information includes two parts of information, an SSS sequence and one of the frequency domain offset and the time domain offset of the time-frequency resource occupied by the DMRS sequence and the orthogonal cover code (OCC) of the DMRS sequence may be used to respectively indicate the two parts of information; or the SSS sequence and one of the PBCH payload, the scrambling sequence of the PBCH, the cyclic shift adopted by the bit information contained in the PBCH and the cyclic redundancy check (CRC) mask of CRC carried by the scrambled PBCH may be used to respectively indicate the two parts of information; or the DMRS sequence and one of the frequency domain offset and the time domain offset of the time-frequency resource occupied by the DMRS sequence and the orthogonal cover code (OCC) of the DMRS sequence to respectively indicate the two parts of information; or the DMRS sequence and one of the PBCH payload, the scrambling sequence of the PBCH, the cyclic shift adopted by the bit information contained in the PBCH and the cyclic redundancy check (CRC) mask of CRC carried by the scrambled PBCH may be used to respectively indicate the two parts of information; or one of the frequency domain offset and the time domain offset of the time-frequency resource occupied by the DMRS sequence and the orthogonal cover code (OCC) of the DMRS sequence, and one of the PBCH payload, the scrambling sequence of the PBCH, the cyclic shift adopted by the bit information contained in the PBCH and the cyclic redundancy check (CRC) mask of CRC carried by the scrambled PBCH may be used to respectively indicate the two parts of information; or a TTS sequence and one of a frequency domain offset and a time domain offset of a time-frequency resource occupied by the DMRS sequence and the orthogonal cover code (OCC) of the DMRS sequence may be used to respectively indicate the two parts of information; or the TSS sequence, and one of the PBCH payload, the scrambling sequence of the PBCH, the cyclic shift adopted by the bit information contained in the PBCH and the cyclic redundancy check (CRC) mask of CRC carried by the scrambled PBCH may be used to respectively indicate the two parts of information.

For example, when the first indication information includes X (X is greater than 2) parts of information, $S_1$ of the SSS sequence, the DMRS sequence and the TSS sequence, $S_2$ of the frequency domain offset and time domain offset of the time-frequency resource occupied by the DMRS sequence and the orthogonal cover code (OCC) of the DMRS sequence, and $S_3$ of the PBCH payload, the scrambling sequence of the PBCH, the cyclic shift used by the bit information contained in the PBCH and the CRC mask of cyclic redundancy check carried by the scrambled PBCH, may be used to respectively indicate the X parts of information; where, S1+S2+S3=X, $S_1$ is an integer less than or equal to 3, $S_2$ is an integer less than or equal to 3, and $S_3$ is an integer less than or equal to 4; however, the embodiment is not limited thereto.

Thus, the at least two parts of information may be explicitly indicated, such as being indicated via the PBCH payload, or may be implicitly indicated, that is, implicitly indicated by reusing an existing signal sequence, signal sequence resource position, coding scheme of a signal sequence, coding modulation scheme of a PBCH, such as implicitly indicated by via the SSS sequence or the DMRS sequence or the TSS sequence itself; or the frequency domain offset and the time domain offset of the time-frequency resource occupied by the DMRS sequence or the orthogonal cover code (OCC) of the DMRS sequence; or the scrambling sequence of the PBCH, or the cyclic shift adopted by the bit information contained in the PBCH, or the cyclic redundancy check (CRC) mask of CRC carried by the scrambled PBCH, thereby saving signaling overhead.

Therefore, by respectively indicating the at least two parts of information in the first indication information by the above-described at least two types of information, a plurality of problems existing in indication manners in the related art may be avoided.

In an embodiment, the method further includes:

block 100: a mapping relationship between the information and a part of position information used for determining positions of SS/PBCH blocks indicated by the information is configured.

For example, a mapping relationship between a signal sequence (an SSS sequence, or a DMRS sequence, or a TSS sequence), the information on a physical broadcast channel (PBCH) (the PBCH payload, the scrambling sequence of the PBCH, and/or the cyclic shift adopted by the bit information contained in the PBCH, and/or the cyclic redundancy check (CRC) mask of CRC carried by the scrambled PBCH), the information on a DMRS sequence (the frequency domain offset and the time domain offset of the time-frequency resource occupied by the DMRS sequence and the orthogonal cover code (OCC) of the DMRS sequence), and the part of position information used for determining positions of SS/PBCH blocks and indicated by the above information, is predefined or preconfigured. The mapping relationship is predefined or preconfigured at a UE side, or is notified by a base station to the UE, and according to the first indication information and the mapping relationship, the UE respectively determines at least two parts of position information indicating the position of an SS/PBCH block, and according to the at least two parts of position information, determines the position of the SS/PBCH block in the SS burst set, so as to acquire frame timing.

How to indicate the partial position information by the above information shall be respectively described below. The partial position information may be partial information of the SS/PBCH block index (a part of bits, such as a part of bits characterizing the SS/PBCH block index of the SS/PBCH block in the whole signal transmission period, or a part or all of bits characterizing the group index, or a part or all of bits of index in the group); for the convenience of description, the partial information is collectively referred to as an index 1, the number of each part of bits is X', and L1 denotes an index value, which are all positive integers; where, L1+1 is equal to $2^{X'}$.

1. Signal Sequence

1) In indicating corresponding indexes 1 by different SSS sequences, a mapping relationship between the SSS sequences and the indexes 1 needs to be preconfigured. Table 1 shows the mapping relationship between the SSS sequences and the indexes 1 when a PCI is 1.

TABLE 1

| 1 | SSS sequence $r_{1,N_{ID}^{cell}=1}^{SSS}(m)$ |
|---|---|
| 0 | $r_{0,N_{ID}^{cell}=1}^{SSS}(m)$ |
| 1 | $r_{1,N_{ID}^{cell}=1}^{SSS}(m)$ |
| 2 | $r_{2,N_{ID}^{cell}=1}^{SSS}(m)$ |
| 3 | $r_{3,N_{ID}^{cell}=1}^{SSS}(m)$ |
| ... | ... |
| L1 | $r_{L1,N_{ID}^{cell}=1}^{SSS}(m)$ | where, $r_{l,N_{ID}^{cell}}^{SSS}(m)$ denotes SSS sequences, different $r_{l,N_{ID}^{cell}}^{SSS}(m)$ corresponding to 1 one by one, where, m=0, 1, ..., $L^{SSS}-1$, $L^{SSS}$ denoting a length of an SSS sequence, L being a positive integer. And the UE may determine the index 1 according to the above mapping relationship and detected SSS sequences.

2) In indicating different indexes 1 by different demodulation reference signal (DMRS) sequences of PBCHs, a mapping relationship between the DMRS sequences and the indexes 1 needs to be preconfigured. Table 2 shows the mapping relationship between the DMRS sequences and the indexes 1.

TABLE 2

| 1 | DMRS sequences $r_1^{DMRS}(m)$ |
|---|---|
| 0 | $r_0^{DMRS}(m)$ |
| 1 | $r_1^{DMRS}(m)$ |
| 2 | $r_2^{DMRS}(m)$ |
| 3 | $r_3^{DMRS}(m)$ |
| ... | ... |
| L1 | $r_{L1}^{DMRS}(m)$ | where, as shown in FIG. 2, $r_1^{DMRS}(m)$ denotes the DMRS sequences, different $r_1^{DMRS}(m)$ corresponding to 1 one by one, where, m=0, 1, $L^{DMRS}-1$, $L^{DMRS}$ denoting a length of a DMRS sequence, L being a positive integer. And the UE may determine the index 1 according to the above mapping relationship and detected DMRS sequences.

What is different from the mapping relationship in 1) is that a mapping relationship between the DMRS sequences and the higher bits and lower bits of the SS/PBCH block indexes may further be configured via generation of the DMRS sequences, that is, the DMRS sequences are generated at least based on a partial position information of the SS/PBCH blocks, thereby determining a mapping relationship between the DMRS sequences and a partial position information of the SS/PBCH blocks indicated by them.

For example, a DMRS sequence generated based on the SS/PBCH block index is pseudo-random sequence, and may be generated in the following manner:

$$r_l^{DMRS}(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots, 2N_{RB}^{DMRS,DL} - 1;$$

where, $1=0, 1, \ldots, M-1$ or $N-1$ denotes the SS/PBCH block index indicated by the sequence, and $N_{RB}^{DMRS,DL}$ denotes the number of resource blocks (RBs) occupied by the DMRS; for example, a DMRS in each RB occupy 2 REs, i.e. $L^{DMRS}=2N_{RB}^{DMRS,DL}$, the pseudo-random sequence c(n) is generated based on a Gold sequence of a length of 31:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2;$$

where, $N_C=1600$, and an initial value of first m sequence is $x_1(0)=1$, $x_1(n)=0$, $n=1, 2, \ldots, 30$, and an initial value of second m sequence is $c_{init}=\Sigma_{i=0}^{30}x_2(i)\cdot 2^i$.

If the DMRS sequence is generated based on only the SS/PBCH block index, the initial value of second m sequences is, for example, $$c_{init}=l \qquad \text{formula (1).}$$

If the DMRS sequence is generated based on the SS/PBCH block index and other information, the initial value of second m sequences is, for example, $$c_{init}=2^3 \cdot N_{ID}^{cell}+l \qquad \text{formula (2).}$$

If the DMRS sequence is generated based on the SS/PBCH block index, a PCI and a CP length, the initial value of second m sequences is, for example, $$c_{init}=2^3 \cdot N_{ID}^{cell}+2\cdot l+N_{CP} \qquad \text{formula (3).}$$

where, $$N_{CP} = \begin{cases} 1 & \text{for normal } CP \\ 0 & \text{for exended } CP \end{cases}.$$

The UE may determine the index 1 according to detected DMRS sequence.

3) In indicating corresponding indexes 1 by different TSS sequences, a mapping relationship between the TSS sequences and the indexes 1 needs to be preconfigured, a particular manner of configuration being similar to 1), and being not going to be described herein any further.

2. Information on a Physical Broadcast Channel (PBCH)

1) Different indexes 1 are indicated by different PBCH payloads; wherein, the PBCH payloads denote bit information contained in PBCHs. A mapping relationship between the bit information contained in PBCHs and the indexes 1 needs to be preconfigured. Table 3 shows the mapping relationship between the bit information contained in PBCHs and the indexes 1.

TABLE 3

| 1 | Bit information contained in PBCHs |
|---|---|
| 1 | 0 . . . 1 |
| 2 | 0 . . . 10 |
| . . . | . . . |
| L1 | 11 . . . 1 |

The UE may determine the index 1 according to the above mapping relationship and received PBCHs.

2) Different indexes 1 are indicated by different scrambling sequences of PBCHs; wherein, the scrambling sequences of PBCHs are generated in different manners, and a mapping relationship between different scrambling sequences and the indexes 1. The UE may determine the index 1 according to the above mapping relationship by detecting the scrambling sequence of a PBCH. For example, a manner for generating the scrambling sequence is similar to those for generating the DMRS sequence, and a manner for configuring the mapping relationship is similar to that of the DMRS sequences, which shall not be described herein any further.

3) Different indexes 1 are indicated by different cyclic shifts adopted by the bit information contained in the PBCHs; wherein, a mapping relationship between the different cyclic shifts and the indexes 1 needs to be preconfigured. Table 4 shows the mapping relationship between the different cyclic shifts adopted by the bit information contained in the PBCHs and the indexes 1.

TABLE 4

| 1 | Bit information contained in the PBCHs |
|---|---|
| 1 | $x_Z \ldots x_2 x_1 x_0$ |
| 2 | $\ldots x_2 x_1 x_0 x_Z$ |
| . . . | . . . |
| L1 | $x_0 x_Z \ldots x_2 x_1$ | where, the PBCHs contain Z bits; for example, a step of a cyclic shift is 1, and there exist Z different bit cyclic shifts, which may denote different indexes 1; where, Z is equal to L1. And the UE may determine the index 1 according to the above mapping relationship and received cyclic shift adopted by the PBCH.

4) Different indexes 1 are indicated by different cyclic redundancy check (CRC) mask of CRC carried by scrambled PBCHs. For example, in transmitting the SS/PBCH blocks, CRC of transport blocks carried by the PBCHs is scrambled by corresponding CRC masks selected according to the indexes of the SS/PBCH blocks; wherein, a mapping relationship between CRC mask sequences and the indexes 1 needs to be preconfigured. Table 5 shows the mapping relationship between the bit information contained in the PBCH and the indexes 1.

TABLE 5

| 1 | CRC mask |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| L1 | <1, 0, 1, 0, 1, 0, 1, 0, 1, 0, 1, 0, 1, 0, 1, 0> |

And the UE may determine the index 1 according to the mapping relationship by performing blind detection on the CRC mask used by the CRC of the transport block carried by the PBCH in the SS/PBCH block.

3. Information on a DMRS Sequence

1) Different indexes 1 are indicated by different time-frequency resource positions occupied by DMRS sequences; wherein, the time-frequency resource positions may be denoted by the frequency domain offset or the time domain offset of the time-frequency resources. A mapping relationship between the frequency domain offset or the time domain offset of the time-frequency resources occupied by the DMRS and the indexes 1 needs to be preconfigured. And the UE may determine the index 1 according to the mapping relationship by detecting the frequency domain offset or the time domain offset of the time-frequency resources occupied by the DMRS.

2) OCCs of the DMRS Sequences

Different indexes 1 are indicated by different OCCs used by the DMRS sequences; wherein, a mapping relationship between the OCCs and the indexes 1 needs to be preconfigured. Table 6 shows the mapping relationship between the OCCs and the indexes 1.

TABLE 6

| 1 | OCC |
|---|---|
| 1 | [+1 +1 +1 +1] |
| 2 | [+1 −1 +1 −1] |
| ... | ... |
| L1 | [−1 +1 +1 −1] |

And the UE may determine the index 1 according to the mapping relationship by detecting the OCC used by the DMRS.

How the partial location information is indicated by the above information is described above. It should be noted that the methods for indicating different partial position information by the above information are identical, and any X methods thereof may be used to respectively indicate different partial information (partial bits) of the SS/PBCH block index; for example, the most significant bits of the SS/PBCH block index is indicated by the SSS sequence, and the least significant bits of the SS/PBCH block index is indicated by the PBCH payload, and vice versa. Alternatively, the most significant bits of the SS/PBCH block index may be indicated by the SSS sequence, and the least significant bits of the SS/PBCH block index may be indicated by the DMRS sequence, and vice versa. Here, X=2 is taken as an example only, and cases are similar where X is greater than 2, which shall not be enumerated herein any further.

In an embodiment, the method may further include:

block 102 (optional): when at least a part of the first indication information is indicated by a signal sequence, information for acknowledging position or a part of position of a detected synchronization signal (SS)/physical broadcast channel (PBCH) block (SS/PBCH block) in the signal transmission period (SS burst set) is transmitted to the UE.

Hence, after the UE acquires the position or a part of the position of the SS/PBCH block according to the first indication information, it may further acknowledge whether the position or a part of the position of the SS/PBCH block is correct according to the information for acknowledgement.

In an embodiment, the information for acknowledgement may be indicated by using the information on a PBCH, such as the PBCH payload, and/or the scrambling sequence of the PBCH, and/or the cyclic shift used by the bit information contained in the PBCH, and/or the CRC mask of the cyclic redundancy check (CRC) carried by the PBCH, and reference may be made to information 2 in Embodiment 1 for particular implementation, which shall not be described herein any further.

Figure 6:
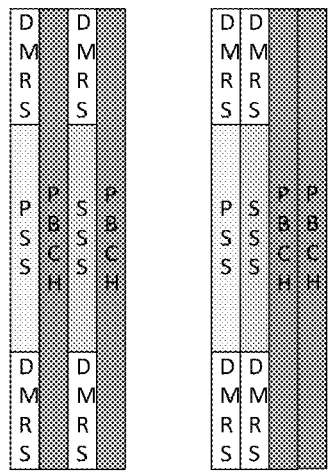

In an embodiment, the SS/PBCH block include a PSS, an SSS and/or a PBCH and/or a DMRS for PBCH demodulation. FIG. 6 is a schematic diagram of a structure of the SS/PBCH block. As shown in FIG. 6, at least a part of the DMRS may be placed in the symbol where the synchronization signal is located.

In an embodiment, at least two parts of information of the first indication information are transmitted to the UE simultaneously or nonsimultaneously. For example, when the at least two parts of information are indicated by the information on the DMRS sequence, at least two parts of information are simultaneously transmitted. For example, when the at least two parts of information are respectively indicated by the SSS sequence and the information on the PBCH or the information on the DMRS sequence, the at least two parts of information may be transmitted nonsimultaneously, which shall not be enumerated herein any further.

With the embodiment, the positions of the synchronization signals in the signal transmission period are indicated by the at least two parts of information, so as to support frame timing at the UE side, thereby solving problems existing currently.

Embodiment 2

Embodiment 2 provides an information detection method, applicable to a UE side.

Figure 7:
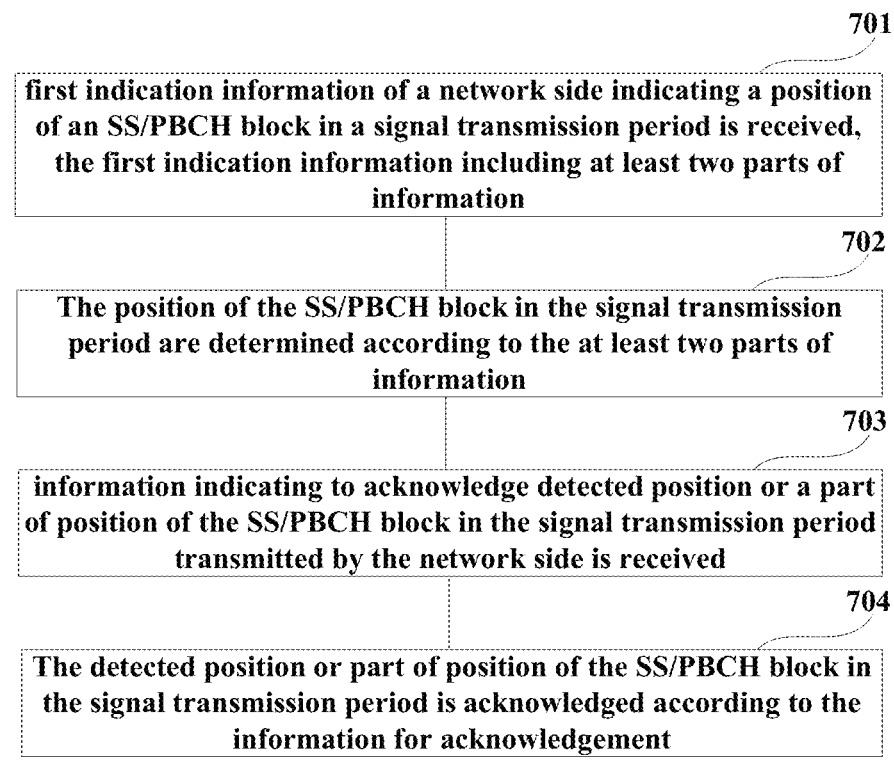

FIG. 7 is a flowchart of the information detection method in Embodiment 2. As shown in FIG. 7, the method includes:

block 701: first indication information of a network side indicating a position of a synchronization signal (SS)/physical broadcast channel (PBCH) block in a signal transmission period is received, the first indication information including at least two parts of information.

In an embodiment, manners for characterizing a position of an SS/PBCH block correspond respectively Embodiment 1, and shall not be described herein any further.

In an embodiment, each of the at least two parts of information is used to indicate a part of position information of the SS/PBCH block. Reference may be made to Embodiment 1 for particular implementations of the at least two parts of information, with repeated parts being not going to be described herein any further.

In block 701, the UE may receive the first indication information by detecting signal sequences and/or receiving PBCH.

In an embodiment, the method may further include:

block 702: the position of the SS/PBCH block in the signal transmission period are determined according to the at least two parts of information.

In block 702, the UE obtains a mapping relationship configured by the network side between the information and the part of position information used for determining the position of the SS/PBCH block indicated by the information, or configures a mapping relationship between the information and the part of position information used for determining the position of the SS/PBCH block indicated by the information, and determines the position of the SS/PBCH block in the signal transmission period according to the at least two parts of information and the mapping relationship.

For example, reference may be made to Embodiment 1 for particular implementation of the mapping relationship. For example, X parts of information are included in the first indication information, in which the X parts of information are used to indicate partial information (partial bits) characterizing the SS/PBCH block index of the SS/PBCH block in the whole signal transmission period, and the partial bits of the SS/PBCH block index may be respectively determined according to the X parts of information and the mapping relationship, so as to determine the SS/PBCH block index, thereby determining the position of the SS/PBCH block in the SS burst set and obtaining frame timing; or when the X parts of information are respectively used to indicate all or part of the bits of the group index of the group, and indicate all or part of the bits of the index of the SS/PBCH blocks in the group, the group index and the index of the SS/PBCH block in the group may respectively be determined according to the X parts of information and the mapping relationship, thereby determining the position of the SS/PBCH block in the SS burst set and obtaining frame timing.

In an embodiment, the method may further include:

block 703: information indicating to acknowledge detected position or a part of position of the SS/PBCH block in the signal transmission period (SS burst set) transmitted by the network side is received;

wherein, Embodiment 1 may be referred to for particular implementation of the information for acknowledgement, which shall not be described herein any further;

block 704: the detected position or part of position of the SS/PBCH block in the signal transmission period (SS burst set) is acknowledged according to the information for acknowledgement.

In an embodiment, in acknowledging the detected position or part of position of the SS/PBCH block in the signal transmission period (SS burst set) according to the information for acknowledgement, the first indication information indicates by using a signal sequence (such as an SSS sequence and/or a DMRS sequence and/or information on a DMRS sequence and/or a TSS sequence), the UE detects the position or part of position of the SS/PBCH block in the signal transmission period (SS burst set) by detecting the signal sequence, and receives the PBCH according to the information.

For example, the PBCH is decoded in a predetermined manner by using the detected position or part of position of the SS/PBCH block in the signal transmission period (SS burst set), and when the PBCH is correctly decoded, the position or part of position of the SS/PBCH block in the signal transmission period (SS burst set) is acknowledged as the detected position or part of position. And if it is unable to be correctly decoded, the UE detects again. Reference may be made to the related art for a particular manner of decoding, which shall not be described herein any further.

In an embodiment, when the SS/PBCH block is transmitted by the network device side, the SS/PBCH block include a PSS, an SSS and/or a PBCH, and/or a DMRS for PBCH demodulation. As described in the manner in Embodiment 1, the position of the SS/PBCH block in the signal transmission period (SS burst set) is indicated respectively by the SSS and/or the PBCH and/or the DMRS for PBCH demodulation and related information, and the UE determines the position of the SS/PBCH block in the signal transmission period according to the received SS/PBCH block.

For example, the two parts of information (the most significant bits and least significant bits of the SS/PBCH block index) of the first indication information are respectively indicated by the SSS sequence and the PBCH payload, the network device side transmits the SS/PBCH block containing the SSS and the PBCH, the UE detects the SSS sequence according to the received SS/PBCH block, determines the most significant bits of the SS/PBCH block index according to the SSS sequence and the preobtained mapping relationship between the SSS sequence and the index, determines the least significant bits of the SS/PBCH block index according to the received PBCH and the preobtained mapping relationship between the PBCH payload and the index, so as to determine the SS/PBCH block index, thereby determining the position of the SS/PBCH block in the SS burst set and obtaining frame timing.

For example, the two parts of information (the group index of the SS/PBCH block and the SS/PBCH block index in the group) of the first indication information are respectively indicated by the SSS sequence and the DMRS sequence, the network device side transmits the SS/PBCH blocks containing the SSS and the DMRS, the UE detects the SSS sequence and the DMRS sequence according to the received SS/PBCH block, determines the group index according to the SSS sequence and the preobtained mapping relationship between the SSS sequence and the index, determines the SS/PBCH block index in the groups according to the mapping relationship between the DMRS sequence and the index, so as to determine the SS/PBCH block index, thereby determining the position of the SS/PBCH block in the SS burst set and obtaining frame timing.

For example, the two parts of information (the most significant bits and least significant bits of the SS/PBCH block index) of the first indication information are respectively indicated by the OCC of the DMRS and the scrambling sequence of the PBCH, the network device side transmits the SS/PBCH blocks containing the DMRS and the PBCH, the UE detects the DMRS according to the received SS/PBCH blocks, determines the most significant bits of the SS/PBCH block index according to the OCC of the DMRS and the preobtained mapping relationship between the OCC of the DMRS and the index, determines the least significant bits of the SS/PBCH block index according to the received PBCH and the preobtained mapping relationship between the scrambling sequence of the PBCH and the index, so as to determine the SS/PBCH block index, thereby determining the position of the SS/PBCH block in the SS burst set and obtaining frame timing.

How to indicate the two parts of information of the first indication information is illustrated above. However, the embodiment is not limited thereto, and the first indication information may include the at least three parts of information, and each part of information may also be indicated by other information. Reference may be made to Embodiment 1 for details, which shall not be described herein any further.

With the embodiment, the positions of the synchronization signals in the signal transmission period are indicated by the at least two parts of information, so as to support frame timing at the UE side, thereby solving problems existing currently.

Embodiment 3

Embodiment 3 provides an information configuration method, applicable to a network device side.

Figure 8:
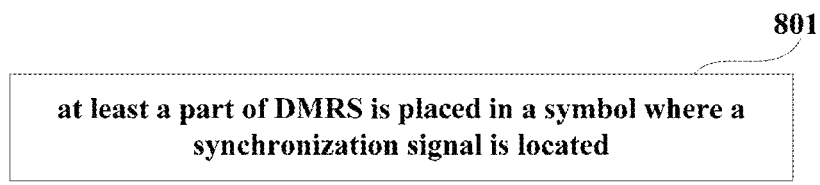

FIG. 8 is a flowchart of the information configuration method in Embodiment 3. As shown in FIG. 8, the method includes:

block 801: at least a part of DMRS is placed in a symbol where a synchronization signal is located.

Reference may be made to Embodiment 1 for details, which shall not be described herein any further.

Embodiment 4

Embodiment 4 provides an information indication apparatus. As a principle of the apparatus for solving problems is similar to that of the method in Embodiment 1, reference may be made to the implementation of the method in Embodiment 1 for implementation of the apparatus, with identical contents being not going to be described herein any further.

Figure 9:
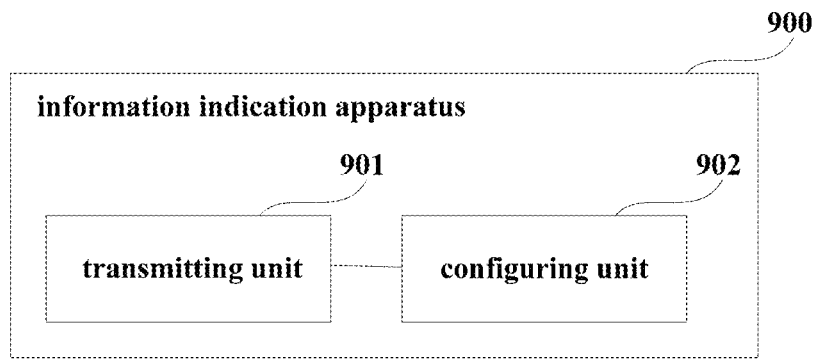

FIG. 9 is a schematic diagram of the information indication apparatus of Embodiment 4 of this disclosure. As shown in FIG. 9, an information indication apparatus 900 includes:

a transmitting unit 901 configured to transmit first indication information to a UE indicating a position of a synchronization signal (SS)/physical broadcast channel (PBCH) block in a signal transmission period (SS/PBCH block set); wherein, the first indication information includes at least two parts of information.

In an embodiment, a manner for characterizing the position of the SS/PBCH block corresponds to that in Embodiment 1, which shall not be described herein any further.

In an embodiment, each of the at least two parts of information is used to indicate a part of position information of the position of the SS/PBCH block. Reference may be made to Embodiment 1 for particular implementation of the at least two parts of information of the first indication information, which shall not be described herein any further.

For example, the at least two parts of information of the first indication information is transmitted to the UE simultaneously or nonsimultaneously.

In an embodiment, the apparatus further includes:

a configuring unit 902 configured to configure a mapping relationship between the information and a part of position information used for determining the position of the SS/PBCH block indicated by the information.

In an embodiment, when at least one part of the first indication information is indicated by the signal sequence, the transmitting unit 901 is further configured to transmit information to the UE indicating to acknowledge detected positions or part of positions of the SS/PBCH blocks in the signal transmission period (SS burst set).

For example, at least a part of DMRS is placed in a symbol where a synchronization signal is located.

In an embodiment, reference may be made to blocks 100-102 in Embodiment 1 for particular implementation of the transmitting unit 901 and the configuring unit 902, which shall not be described herein any further.

With the embodiment, the positions of the synchronization signals in the signal transmission period are indicated by the at least two parts of information, so as to support frame timing at the UE side, thereby solving problems existing currently.

Embodiment 5

Embodiment 5 provides a network device. As a principle of the network device for solving problems is similar to that of the method in Embodiment 1, reference may be made to the implementation of the method in Embodiment 1 for implementation of the network device, with identical contents being not going to be described herein any further.

Figure 10:
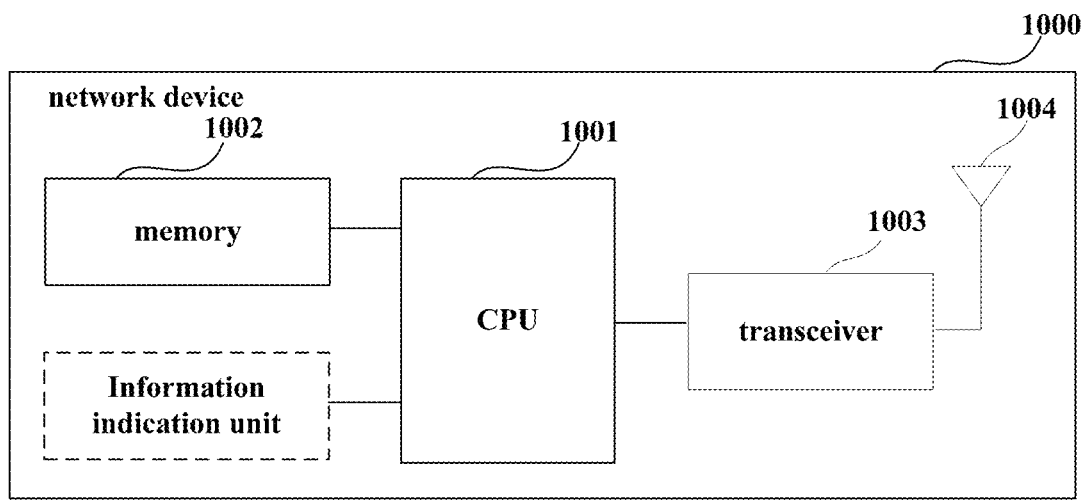

FIG. 10 is a schematic diagram of a structure of the network device of the embodiment of this disclosure. As shown in FIG. 10, a network device 1000 may include a central processing unit (CPU) 1001 and a memory 1002, the memory 1002 being coupled to the central processing unit 1001. For example, the memory 1002 may store various data, and furthermore, it may store a program for data processing, and execute the program under control of the central processing unit 1001, so as to transmit indication information.

In one implementation, the functions of the apparatus 900 may be integrated into the central processing unit 1001. For example, the central processing unit 1001 may be configured to carry out the information indication method as described in Embodiment 1.

For example, the central processing unit 1001 may be configured to: transmit first indication information to a UE indicating a position of a synchronization signal (SS)/physical broadcast channel (PBCH) block in a signal transmission period; wherein, the first indication information includes at least two parts of information.

In an embodiment, a manner for characterizing the position of the SS/PBCH block corresponds to that in Embodiment 1, which shall not be described herein any further.

In an embodiment, each of the at least two parts of information is used to indicate a part of position information of the position of the SS/PBCH block. Reference may be made to Embodiment 1 for particular implementation of the at least two parts of information of the first indication information, which shall not be described herein any further.

For example, the central processing unit 1001 may be configured to: transmit the at least two parts of information of the first indication information to the UE simultaneously or nonsimultaneously.

For example, the central processing unit 1001 may be configured to: configure a mapping relationship between the information and a part of position information used for determining the position of the SS/PBCH block indicated by the information.

For example, the central processing unit 1001 may be configured to: when at least one part of the first indication information is indicated by the signal sequence, transmit information to the UE indicating to acknowledge detected positions or part of positions of the SS/PBCH blocks in the signal transmission period.

For example, at least a part of DMRS is placed in a symbol where a synchronization signal is located.

For example, reference may be made to Embodiment 1 or 2 for other configuration manners of the central processing unit 1001, which shall not be described herein any further.

In another implementation, the above apparatus 900 and the central processing unit 1001 may be configured separately. For example, the apparatus 900 may be configured as a chip connected to the central processing unit 1001, with its functions being realized under control of the central processing unit 1001.

As shown in FIG. 10, the network device 1000 may further include a transceiver 1003, and an antenna 1004, etc. For example, functions of the above components are similar to those in the related art, and shall not be described herein any further. It should be noted that the network device 1000 does not necessarily include all the parts shown in FIG. 10, and furthermore, the network device 1000 may include parts not shown in FIG. 10, and the related art may be referred to.

With the embodiment, the positions of the synchronization signals in the signal transmission period are indicated by the at least two parts of information, so as to support frame timing at the UE side, thereby solving problems existing currently.

Embodiment 6

Embodiment 6 provides an information detection apparatus. As a principle of the apparatus for solving problems is similar to that of the method in Embodiment 2, reference may be made to the implementation of the method in Embodiment 2 for implementation of the apparatus, with identical contents being not going to be described herein any further.

Figure 11:
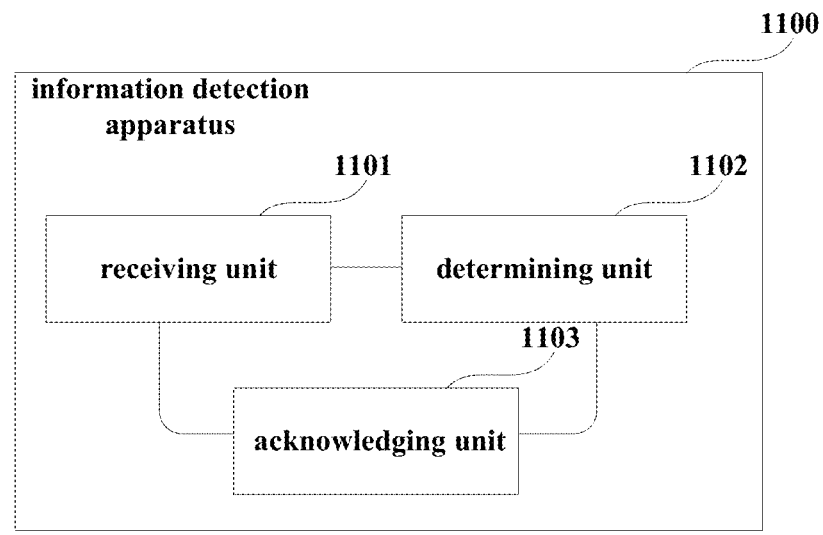

FIG. 11 is a schematic diagram of the information detection apparatus of the embodiment of this disclosure. As shown in FIG. 11, an information detection apparatus 1100 includes:

a receiving unit 1101 configured to receive first indication information of a network side indicating a position of a synchronization signal (SS)/physical broadcast channel (PBCH) block in a signal transmission period (SS burst set), the first indication information including at least two parts of information.

In an embodiment, a manner for characterizing the position of the SS/PBCH block corresponds to that in Embodiment 1, which shall not be described herein any further.

In an embodiment, each of the at least two parts of information is used to indicate a part of position information of the position of the SS/PBCH block. Reference may be made to Embodiment 1 for particular implementation of the at least two parts of information of the first indication information, which shall not be described herein any further.

In an embodiment, the apparatus may further include:

a determining unit 1102 configured to determine the position of the SS/PBCH block in the signal transmission period according to the at least two parts of information.

In an embodiment, the apparatus may further include:

an acquiring unit (not shown) configured to obtain a mapping relationship configured by the network side between the information and a part of position information used for determining the position of the SS/PBCH block indicated by the information, or configured to configure a mapping relationship between the information and a part of position information used for determining the position of the SS/PBCH block indicated by the information.

And the determining unit 1102 determines the position of the SS/PBCH block in the signal transmission period according to the at least two parts of information and the mapping relationship.

In an embodiment, the receiving unit 1101 is further configured to receive information indicating to acknowledge detected positions or a part of positions of the SS/PBCH blocks in the signal transmission period transmitted by the network side.

In an embodiment, the apparatus further includes:

an acknowledging unit 1103 (optional) configured to acknowledge the detected positions or part of positions of the SS/PBCH blocks in the signal transmission period according to the information for acknowledgement.

For example, the acknowledging unit 1103 decodes a PBCH in a predetermined manner by using the detected positions or part of positions of the SS/PBCH blocks in the signal transmission period, and when the PBCH is correctly decoded, acknowledges that the positions or part of positions of the SS/PBCH blocks in the signal transmission period is the detected positions or part of positions.

In an embodiment, reference may be made to blocks 701-703 in Embodiment 2 for particular implementation of the receiving unit 1101, the determining unit 1102 and the acknowledging unit 1103, which shall not be described herein any further.

With the embodiment, the positions of the synchronization signals in the signal transmission period are indicated by the at least two parts of information, so as to support frame timing at the UE side, thereby solving problems existing currently.

Embodiment 7

Embodiment 7 provides a UE. As a principle of the UE for solving problems is similar to that of the method in Embodiment 2, reference may be made to the implementation of the method in Embodiment 2 for implementation of the UE, with identical contents being not going to be described herein any further.

FIG. 12 is a schematic diagram of a structure of the UE of the embodiment of this disclosure. As shown in FIG. 12, UE 1200 may include a central processing unit (CPU) 1201 and a memory 1202, the memory 1202 being coupled to the central processing unit 1201. For example, the memory 1202 may store various data, and furthermore, it may store a program for data processing, and execute the program under control of the central processing unit, so as to detect indication information.

In one implementation, the functions of the apparatus 1100 may be integrated into the central processing unit 1201. For example, the central processing unit 1201 may be configured to carry out the information indication method as described in Embodiment 3.

For example, the central processing unit 1201 may be configured to: receive first indication information of a network side indicating a position of a synchronization signal (SS)/physical broadcast channel (PBCH) block in a signal transmission period, the first indication information including at least two parts of information.

In an embodiment, a manner for characterizing the position of the SS/PBCH block corresponds to that in Embodiment 1, which shall not be described herein any further.

In an embodiment, each of the at least two parts of information is used to indicate a part of position information of the position of the SS/PBCH block. Reference may be made to Embodiment 1 for particular implementation of the at least two parts of information of the first indication information, which shall not be described herein any further.

For example, the central processing unit 1201 may be configured to: determine the position of the SS/PBCH block in the signal transmission period according to the at least two parts of information.

For example, the central processing unit 1201 may be configured to: obtain a mapping relationship configured by the network side between the information and a part of position information used for determining the position of the SS/PBCH block indicated by the information, or configured to configure a mapping relationship between the information and a part of position information used for determining the position of the SS/PBCH block indicated by the information.

And the position of the SS/PBCH block in the signal transmission period is determined according to the at least two parts of information and the mapping relationship.

For example, the central processing unit 1201 may be configured to: receive information indicating to acknowledge detected positions or a part of positions of the SS/PBCH blocks in the signal transmission period (SS burst set) transmitted by the network side.

For example, the central processing unit 1201 may be configured to: acknowledge the detected positions or part of positions of the SS/PBCH blocks in the signal transmission period according to the information for acknowledgement.

For example, the central processing unit 1201 may be configured to: decode a PBCH in a predetermined manner by using the detected positions or part of positions of the SS/PBCH blocks in the signal transmission period, and when the PBCH is correctly decoded, acknowledge that the positions or part of positions of the SS/PBCH blocks in the signal transmission period is the detected positions or part of positions.

Furthermore, reference may be made to Embodiment 3 for other configuration manners of the central processing unit 1201, which shall not be described herein any further.

In another implementation, the above apparatus 1100 and the central processing unit 1201 may be configured separately. For example, the apparatus 1100 may be configured as a chip connected to the central processing unit 1201, such as a unit shown in FIG. 12, with its functions being realized under control of the central processing unit 1201.

Furthermore, as shown in FIG. 12, the UE 1200 may further include a communication module 1203, an input unit 1204, a display 1206, an audio processor 1205, an antenna 1207, and a power supply 1208, etc. For example, functions of the above components are similar to those in the related art, and shall not be described herein any further. It should be noted that the UE 1200 does not necessarily include all the parts shown in FIG. 12, and furthermore, the UE 1200 may include parts not shown in FIG. 12, and the related art may be referred to.

With the embodiment, the positions of the synchronization signals in the signal transmission period are indicated by the at least two parts of information, so as to support frame timing at the UE side, thereby solving problems existing currently.

Embodiment 8

Embodiment 8 provides an information configuration apparatus. As a principle of the apparatus for solving problems is similar to that of the method in Embodiment 3, reference may be made to the implementation of the method in Embodiment 3 for implementation of the apparatus, with identical contents being not going to be described herein any further.

FIG. 13 is a schematic diagram of the information configuration apparatus in the embodiment of this disclosure. As shown in FIG. 13, an information configuration apparatus 1300 includes:

a processing unit 1301 configured to place at least a part of DMRS in a symbol where a synchronization signal is located.

Reference may be made to block 801 of Embodiment 3 for particular implementation of the processing unit 1301, which shall not be described herein any further.

Embodiment 9

Embodiment 9 provides a network device. As a principle of the network device for solving problems is similar to that of the method in Embodiment 3, reference may be made to the implementation of the method in Embodiment 3 for implementation of the network device, with identical contents being not going to be described herein any further.

FIG. 14 is a schematic diagram of a structure of the network device of the embodiment of this disclosure. As shown in FIG. 14, a network device 1400 may include a central processing unit (CPU) 1401 and a memory 1402, the memory 1402 being coupled to the central processing unit 1401. For example, the memory 1402 may store various data, and furthermore, it may store a program for data processing, and execute the program under control of the central processing unit 1401, so as to configure information.

In one implementation, the functions of the apparatus 1300 may be integrated into the central processing unit 1401. For example, the central processing unit 1401 may be configured to carry out the information configuration method as described in Embodiment 3.

For example, the central processing unit 1401 may be configured to: place at least a part of DMRS in a symbol where a synchronization signal is located.

For example, reference may be made to Embodiment 4 for other configuration manners of the central processing unit 1401, which shall not be described herein any further.

In another implementation, the above apparatus 1300 and the central processing unit 1401 may be configured separately. For example, the apparatus 1300 may be configured as a chip connected to the central processing unit 1401, such as a unit shown in FIG. 14 with its functions being realized under control of the central processing unit 1401.

Furthermore, as shown in FIG. 14, the network device 1400 may further include a transceiver 1403, and an antenna 1404, etc. For example, functions of the above components are similar to those in the related art, and shall not be described herein any further. It should be noted that the network device 1400 does not necessarily include all the parts shown in FIG. 14, and furthermore, the network device 1400 may include parts not shown in FIG. 14, and the related art may be referred to.

Embodiment 10

Embodiment 10 provides a communication system, at least including the network device described in Embodiment 5 and UE described in Embodiment 7, the contents of which being incorporated herein, which shall not be described herein any further.

FIG. 15 is a flowchart of a method for acquiring frame timing in an embodiment. As shown in FIG. 15, the method includes:

block 1501: a network device transmits SS/PBCH blocks to UE;

wherein, a structure of the SS/PBCH blocks is as shown in FIG. 2 or 6, and positions of the SS/PBCH blocks in a signal transmission period are indicated by an SSS and/or a DMRS and/or a PBCH in the SS/PBCH blocks;

reference may be made to Embodiment 1 for a particular indication manner, which shall not be described herein any further;

block 1502: the UE receives the SS/PBCH blocks, detects the SSS and/or the DMRS and/or a TSS and/or the PBCH, and determines the position of the SS/PBCH block in the signal transmission period according to the at least two parts of information;

reference may be made to block 702 in Embodiment 2 for a particular method of determination, which shall not be described herein any further;

block 1503: information indicating to acknowledge a detected position or a detected part of position of a synchronization signal (SS)/physical broadcast channel (PBCH) block (SS/PBCH block) in the signal transmission period (SS burst set) is transmitted to the UE;

reference may be made to Embodiment 1 for a particular transmission manner and a particular form of the information for acknowledgement, which shall not be described herein any further;

block 1504: the information for acknowledgement is received, and the detected positions or part of positions of the SS/PBCH blocks in the SS burst set are acknowledged according to the information for acknowledgement;

reference may be made to blocks 703-704 in Embodiment 2 for particular implementation, which shall not be described herein any further;

block 1505: frame timing is determined.

In an embodiment, before block 1501, the method may further include:

block 1500: the network device configures a mapping relationship between information on a part of the position of the SS/PBCH block and each part of information of the first indication information, and notifies the mapping relationship to the UE.

reference may be made to block 100 in Embodiment 1 for particular implementation, which shall not be described herein any further.

With the embodiment, the positions of the synchronization signals in the signal transmission period are indicated by the at least two parts of information, so as to support frame timing at the UE side, thereby solving problems existing currently.

An embodiment of the present disclosure provides a computer storage medium, including a computer readable program, which will cause an information indication apparatus or a network device to carry out the information indication method as described in Embodiment 1.

An embodiment of the present disclosure provides a computer readable program, which, when executed in an information indication apparatus or a network device, will cause the information indication apparatus or the network device to carry out the information indication method as described in Embodiment 1.

An embodiment of the present disclosure provides a computer storage medium, including a computer readable program, which will cause an information detection apparatus or UE to carry out the information detection method as described in Embodiment 2.

An embodiment of the present disclosure provides a computer readable program, which, when executed in an information detection apparatus or UE, will cause the information detection apparatus or the UE to carry out the information detection method as described in Embodiment 2.

An embodiment of the present disclosure provides a computer storage medium, including a computer readable program, which will cause an information configuration apparatus or a network device to carry out the information configuration method as described in Embodiment 3.

An embodiment of the present disclosure provides a computer readable program, which, when executed in an information configuration apparatus or a network device, will cause the information configuration apparatus or the network device to carry out the information configuration method as described in Embodiment 3.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 9-14 may either correspond to software modules of procedures of a computer program, or correspond to hardware modules. Such software modules may respectively correspond to the steps shown in FIGS. 1 and 7-8. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 9-14 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 9-14 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Supplement 1. A communication system, including a network device and UE, wherein, the network device transmits first indication information to the UE indicating a position of a synchronization signal (SS)/physical broadcast channel (PBCH) block in a signal transmission period (SS burst set); wherein, the first indication information includes at least two parts of information; and the UE receives the first indication information.

Supplement 2. A frame timing acquisition method, including:

receiving first indication information indicating a position of a synchronization signal (SS)/physical broadcast channel (PBCH) block in a signal transmission period transmitted by a network side, the first indication information including at least two parts of information;

determining the position of the SS/PBCH block in the signal transmission period according to the at least two parts of information; and acquiring frame timing according to the position of the SS/PBCH block in the signal transmission period.

Supplement 3. A frame timing acquisition apparatus, including:

a receiving unit configured to receive first indication information indicating a position of a synchronization signal (SS)/physical broadcast channel (PBCH) block in a signal transmission period transmitted by a network side, the first indication information including at least two parts of information;

a determining unit configured to determine the position of the SS/PBCH block in the signal transmission period according to the at least two parts of information; and an acquiring unit configured to acquire frame timing according to the position of the SS/PBCH block in the signal transmission period.

What is claimed is:

1. A network device, comprising:
a processor circuit configured to generate indication information indicating a position of a synchronization signal (SS)/physical broadcast channel (PBCH) block in a signal transmission period; and
a transmitter configured to transmit the indication information to a user equipment (UE),
wherein the indication information is an index of the SS/PBCH block and the indication information comprises two parts of information, a first part of the indication information is the least significant bits (LSB) of the index of the SS/PBCH block that are indicated by a demodulation reference signal (DMRS) sequence, and a second part of the indication information is the most significant bits (MSB) of the index of the SS/PBCH block that are indicated by a PBCH payload.

2. The network device according to claim 1, wherein the transmitter simultaneously transmits the two parts of indication information to the UE.

3. The network device according to claim 1, wherein each of the two parts of information is indicated by at least one of:
a signal sequence, information on a demodulation reference signal (DMRS) sequence, and information on the PBCH.

4. The network device according to claim 3, wherein the signal sequence comprises one of: a secondary synchronization signal sequence, a demodulation reference signal (DMRS) sequence, and a tertiary synchronization signal (TSS) sequence;
the information on a DMRS sequence comprises one of: a frequency domain offset, a time domain offset of a time-frequency resource occupied by the DMRS sequence, and an orthogonal cover code of the DMRS sequence; and
the information on the PBCH comprises one of: a PBCH payload, a scrambling sequence of a PBCH, or a cyclic shift adopted by bit information contained in a PBCH, and a cyclic redundancy check (CRC) mask of CRC carried by a scrambled PBCH.

5. The network device according to claim 3, wherein the processor circuit is further configured to configure a mapping relationship between the information on the DMRS and a part of position information for determining the position of the SS/PBCH block.

6. The network device according to claim 1, wherein the transmitter is configured to transmit a demodulation reference signal (DMRS), at least a part of the DMRS placed in a symbol where the SS is located in the SS/PBCH block.

7. A User Equipment (UE), comprising:
a receiver configured to receive indication information indicating a position of a synchronization signal (SS)/physical broadcast channel (PBCH) block in a signal transmission period,
wherein the indication information is an index of the SS/PBCH block and the indication information comprising two parts of information, a first part of the indication information is the least significant bits (LSB) of the index of the SS/PBCH block that are indicated by a demodulation reference signal (DMRS) sequence, and a second part of the indication information is the most significant bits (MSB) of the index of the SS/PBCH block that are indicated by a PBCH payload, and
a processor circuit configured to determine the position of the SS/PBCH block according to the indication information,
wherein the receiver further configured to receive the PBCH of the SS/PBCH block according to the least significant bits of the index of the SS/PBCH block indicated by the DMRS and to demodulate the PBCH of the SS/PBCH block by using the DMRS.

8. The UE according to claim 7, wherein each of the two parts of information is indicated by at least one of:
a signal sequence, information on a demodulation reference signal (DMRS) sequence, and information on the PBCH.

9. The UE according to claim 7, wherein the receiver is further configured to receive
mapping relationship information from a network side, the mapping relationship information indicating a relationship between information on a demodulation reference signal (DMRS) and a part of the position information for determining the position of the SS/PBCH block.

10. The UE according to claim 7, wherein the receiver is further configured to receive information indicating to acknowledge a detected position or a part of the position of the SS/PBCH block in the signal transmission period transmitted by a network side, wherein,
the processor circuit is further configured
to acknowledge the detected position or part of the position of the SS/PBCH block in the signal transmission period according to the received information to acknowledge.

11. The network device according to claim 1, wherein the processor circuit is further configured to generate a DMRS sequence based on the LSB of the index of the SS/PBCH block and a cell ID to which the SS/PBCH block corresponds.

12. The UE according to claim 7, wherein the receiver is configured to simultaneously receive the two parts of information transmitted by a network device.

13. The UE according to claim 7, wherein the processor is further configured to generate the DMRS sequence based on the LSB of the index of the SS/PBCH block and a cell ID to which the SS/PBCH block corresponds.

14. The network device according to claim 1, wherein the SS/PBCH block comprises a PSS, an SSS, a PBCH and a DMRS, the DMRS is used for demodulation of the PBCH in the SS/PBCH block.

15. A communication network, comprising:
a network device configured to:
generate indication information indicating a position of a synchronization signal (SS)/physical broadcast channel (PBCH) block in a signal transmission period, and
transmit the indication information, wherein the indication information is an index of the SS/PBCH block and the indication information comprising two parts of information, a first part of the indication information is the least significant bits (LSB) of the index of the SS/PBCH block that are indicated by a demodulation reference signal (DMRS) sequence, and a second part of the indication information is the most significant bits (MSB) of the index of the SS/PBCH block that are indicated by a PBCH payload; and a user equipment configured to receive the indication information.

\* \* \* \* \*